US005519995A

United States Patent [19]

Sasse et al.

[11] Patent Number: 5,519,995

[45] Date of Patent: May 28, 1996

[54] ELECTROHYDRAULIC DEVICE

[75] Inventors: Bernhard Sasse, Kirchhundem; Peter Zimmermann, Wenden, both of Germany

[73] Assignee: Elektro-Mechanik GmbH, Wenden, Germany

[21] Appl. No.: 240,781

[22] PCT Filed: Oct. 30, 1992

[86] PCT No.: PCT/EP92/02486

§ 371 Date: May 12, 1994

§ 102(e) Date: May 12, 1994

[87] PCT Pub. No.: WO93/10361

PCT Pub. Date: May 27, 1993

[30] Foreign Application Priority Data

Nov. 12, 1991 [DE] Germany .......................... 41 37 103.8

[51] Int. Cl.[6] .............................................. F16D 31/02

[52] U.S. Cl. .............................................. 60/476

[58] Field of Search .............................................. 60/476

[56] References Cited

U.S. PATENT DOCUMENTS 2,918,795 12/1959 Marien .................................... 60/476

FOREIGN PATENT DOCUMENTS 842440 6/1952 Germany .

1690019 12/1954 Germany .

2929442 1/1981 Germany .

3607419 1/1987 Germany .

10-7975 6/1935 Japan .

16-1851 2/1941 Japan .

52-102975 8/1977 Japan .

379124 8/1932 United Kingdom .................... 60/476

*Primary Examiner*—F. Daniel Lopez

*Attorney, Agent, or Firm*—Spencer & Frank

[57] ABSTRACT

An electrohydraulic device for generating a force acting on a movable piston rod including a cylinder, a piston disposed in the cylinder forming a first cylinder portion and a second cylinder portion, a first pump disposed adjacent to the cylinder and in communication with the second cylinder portion, a second pump disposed adjacent to the first pump and in communication with the first pump and with the first cylinder portion, a housing defining a reservoir for operating fluid of the electrohydraulic device, the second pump being in communication with the reservoir, and`an electric motor coupled to the first and second pumps by a shaft such that when the electric motor rotates in a first direction, the shaft drives the first pump while the second pump is idle and when the electric motor rotates in a second direction, the shaft drives the second pump while the first pump is idle. The operating fluid is pumped between the first cylinder portion and the second cylinder portion by the first and second pumps as a function of a direction of rotation of the electric motor causing the piston to move based on pressure acting on the piston and generating a force at the piston rod.

6 Claims, 2 Drawing Sheets

ELECTROHYDRAULIC DEVICE

BACKGROUND OF THE INVENTION

1. Field of the Invention

The invention relates to an electrohydraulic device for generating a force to be applied to a vertically movable piston rod that is connected with the piston of a cylinder, the device including a first centrifugal pump disposed in the portion of the cylinder facing away from the piston rod and connected with an electric motor by way of a shaft, a housing for the cylinder and the centrifugal pump, with the housing defining a reservoir for the operating fluid and being provided with passages for the shaft and the piston rod. In dependence on the direction of rotation of the electric motor, the operating fluid is pumped through a pressure conduit from a cylinder chamber above the piston into a portion of the cylinder chamber below the piston or in the opposite direction, thus causing the piston to be moved by the action of pressure and to generate forces at the piston rod.

2. Description of the Related Art

Such a hydraulic device is known from German Utility Model Patent DE-GM 1,690,019. This device has a horizontally arranged impeller wheel equipped with guide vanes and driven by an electric motor. In addition, a valve body is disposed above the impeller wheel and is pivoted by the tangential forces of the operating fluid into one of two fixed positions depending on the direction of rotation of the electric motor. In this way, the operating fluid is given its direction of flow. In the one position, the operating fluid is pumped from a region above the piston into a region below the piston and in the other position, when the motor rotates in the opposite direction, the operating fluid flows in the opposite direction. Depending on the direction of flow, the piston is moved either upward or downward. The drawback is that the manufacture of the valve body requires rather complicated and precision working so that it reliably determines the flow direction.

German Patent 842,440 also discloses an electrohydraulic adjustment device including a motor and a pump. To raise a piston equipped with a piston rod, operating fluid is pumped from a cylinder that is open toward the space above the piston into a pressure chamber below the piston. Thus the piston is hydraulically moved upward.

After the motor is switched off, tensioned counter-springs or raised counter-weights push the piston back into its lower starting position. A drawback of this prior art device is that it generates only an upwardly directed pressure force. If the motor is switched off and during the transition from the upper end position into the lower end position the device itself does not generate force, rather the downward movement of the piston is effected on the basis of a force that acts on the piston rod from the outside.

SUMMARY OF THE INVENTION

It is the object of the invention to provide an electrohydraulic device which generates not only an upwardly directed pressure force at the piston rod but also a downwardly directed traction force, with its manufacturing process being as simple as possible.

This is accomplished according to the invention in that below the first centrifugal pump a second centrifugal pump is provided. Both centrifugal pumps are in communication with the reservoir by way of a passage. The cylinder chamber above the piston is closed toward the reservoir. If the electric motor rotates in a predetermined direction, the shaft drives the first centrifugal pump and if the motor rotates in the opposite direction, the shaft drives the second centrifugal pump while the respective other centrifugal pump idles. If the second centrifugal pump is in operation, the operating fluid is transported through the pressure conduit into the cylinder chamber above the piston and, due to the action of the pressure, the piston is moved downward thus exerting a downwardly acting traction force on the piston rod.

An alternative solution provides that a second centrifugal pump is provided on the shaft below the first centrifugal pump and is in communication, on the one hand, with the first centrifugal pump and, on the other hand, with the reservoir. The cylinder is open above the piston and the surface of the operating fluid lies above the cylinder. At a predetermined direction of rotation of the electric motor, the shaft drives the first centrifugal pump and, in the opposite direction of rotation, the shaft drives the second centrifugal pump while the respectively other centrifugal pump idles. During operation of the second centrifugal pump, the operating fluid is transported into the cylinder chamber above the piston and the action of the pressure moves the piston downward, thus exerting a downwardly acting traction force on the piston rod.

In this electrohydraulic device, a lifting and traction force is generated as a function of the direction of rotation of the motor. With a given direction of rotation of the motor, one of the two centrifugal pumps is driven while the other centrifugal pump idles. Thus, depending on the direction of rotation of the motor, the operating fluid is transported underneath or above the piston and thus an upwardly or downwardly directed pressure is generated.

It is known that a lifting and traction force or generally two oppositely directed forces can be generated by means of a differential piston. The advantage of the electrohydraulic device compared to the differential piston is that no active control elements are required but the control is taken over by the passive system itself.

Modifications of the invention are defined in the dependent claims.

BRIEF DESCRIPTION OF THE DRAWINGS

The essence of the invention will now be described in greater detail with reference to two embodiments thereof that are illustrated in the drawing figures, in which.

DESCRIPTION OF THE PREFERRED EMBODIMENTS

Figure 1:
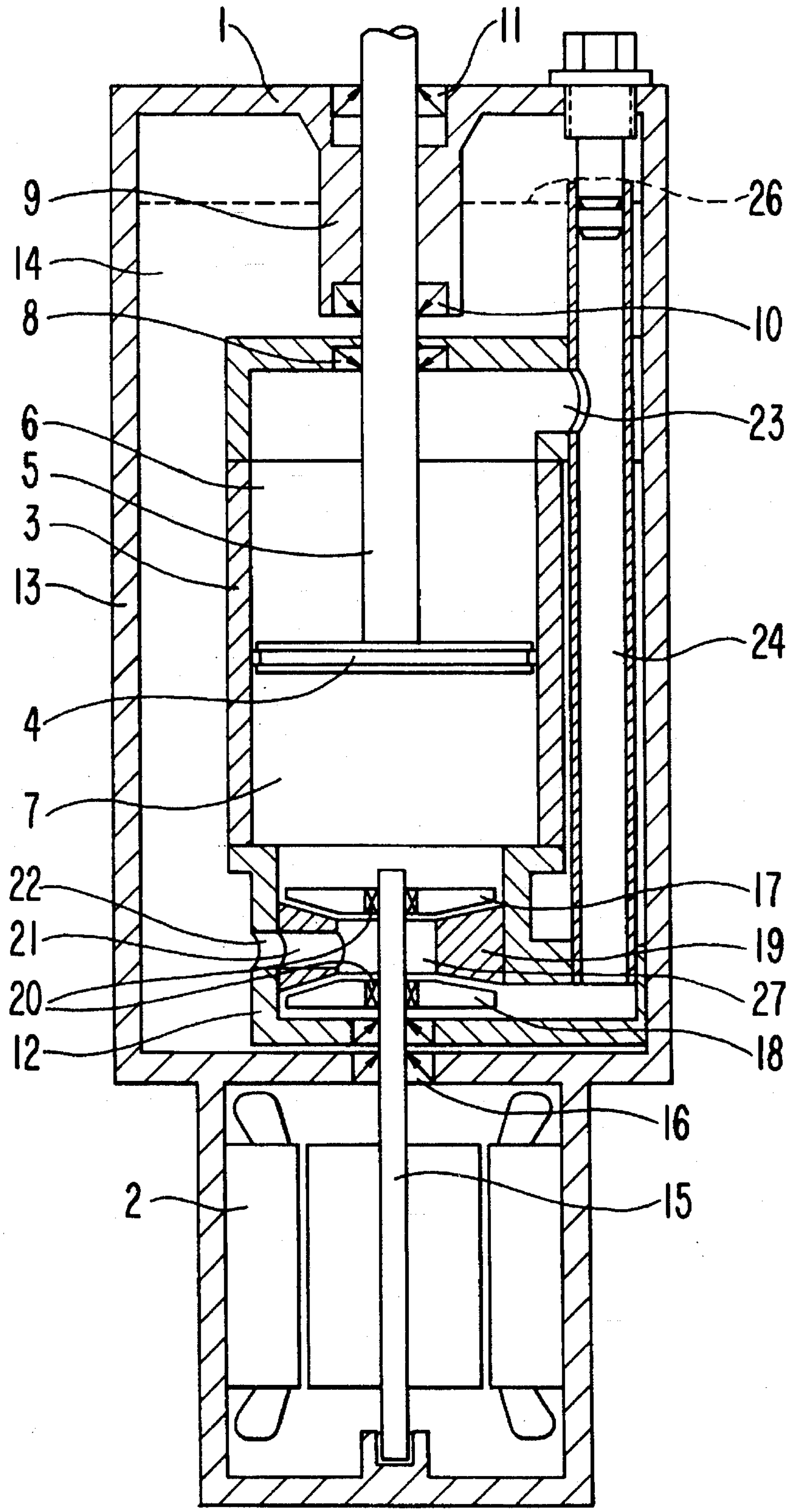
FIG. 1 is a semi-schematic illustration of the electrohydraulic device in its embodiment as a closed system.

In FIG. 1, an electric motor 2 is disposed below the housing 1. In a cylinder 3, a piston 4 is provided which is in communication or connected with a piston rod 5. Piston 4 divides the cylinder chamber into an upper cylinder chamber 6 and a lower cylinder chamber 7. The size of the upper and lower cylinder chambers depends on the position of the piston. Above piston 4, cylinder 3 is closed toward the reservoir 14, thus creating a closed system. Piston rod 5 is brought through the cylinder wall by means of a seal 8. Moreover, housing 1 is provided with a passage 9 for piston rod 5, with a dirt stripper 11 being provided in the upper portion of passage 9 and in the lower portion an external seal 10 that is brought around piston rod 5. In the closed system, the pump pressure acts only on the internal seal 8, while the pressure generated by heating of the operating fluid acts only on the external seal 10.

Below cylinder 3, in direct connection with it, there is provided a pump housing 12 for the two centrifugal pumps. Between wall 13 of housing 1, on the one hand, and cylinder 3 and pump housing 12, a reservoir 14 is formed for the operating fluid.

The level of the operating fluid in the reservoir is dimensioned in such a way that a closed circulation results which has a communicating effect in the operating chamber of the closed system.

Electric motor 2 drives a shaft 15 which projects beyond a sealing passage 16 of housing 1 into pump housing 12. Within the pump housing, shaft 15 is connected with the two centrifugal pumps. In the embodiment, the two centrifugal pumps are constituted of a unit composed of impeller wheels 17 and 18 and a flow body 19. The two impeller wheels 17 and 18 are connected with shaft 15 by way of an idling arrangement 20. In this way, it is accomplished that one or both impeller wheels are carried along in dependence on the direction of rotation of the electric motor and the respective centrifugal pump is driven while the other impeller wheel and its associated centrifugal pump idle. Impeller wheels 17 and 118 are mounted on shaft 15 to face one another.

Flow body 19 has a hollow cylindrical configuration, with flow body 19 being spaced from impeller wheels 17 and 18 and its cylinder faces being adapted approximately to the shape of the impeller wheels. Flow body 19 is provided with a passage 21 and subsequent thereto, pump housing 12 is provided with a passage 22. These two passages 21, 22 are necessary for operation in the closed system. By way of these two passages, reservoir 14 for the operating fluid is in communication with the interior of flow body 19 in order to permit an equalization of volume for the reciprocating piston rod.

When the upper impeller wheel 17 of the first centrifugal pump is driven, operating fluid is sucked by the first (upper) centrifugal pump from the cylinder chamber 6 above piston 4 through passage 27, and through a pressure pipe 24 and is transported into the cylinder chamber 7 below piston 4. This generates a pressure below piston 4 which moves piston 4 upward and generates an upwardly directed pressure force at piston rod 5. The upper cylinder chamber 6 is provided with an opening 23 in its upper portion, thus establishing a connection to pressure pipe 24. Pressure pipe 24 is disposed outside of cylinder 3 and leads through the wall of pump housing 12 into the region of the lower impeller wheel 18 of the second centrifugal pump.

With the motor rotating in the opposite direction, impeller wheel 18 and thus the second centrifugal pump are driven, thus conveying the operating fluid through suction opening 27 and the first centrifugal pump from cylinder chamber 7 through pressure pipe 24 and opening 23 into the upper cylinder chamber 6. This produces a downwardly directed fluid pressure at piston 4 which moves the piston downward and generates a downwardly directed traction force at piston rod 5. During the downward movement of piston 4 in cylinder 3, the operating fluid present below piston 4 is pushed through the first centrifugal pump 17 and suction opening 27, through centrifugal pump 18 and pressure pipe 24 and through opening 23 into the upper cylinder chamber 6. During the reverse movement of the piston toward the top, the operating fluid present above the piston is pushed through opening 23, pressure pipe 24 and the second centrifugal pump and suction opening 27 into the lower cylinder chamber 7.

Thus the system operates in a closed circulation, with the reservoir, the two cylinder chambers and the pressure pipe being in communication with one another.

Figure 2:
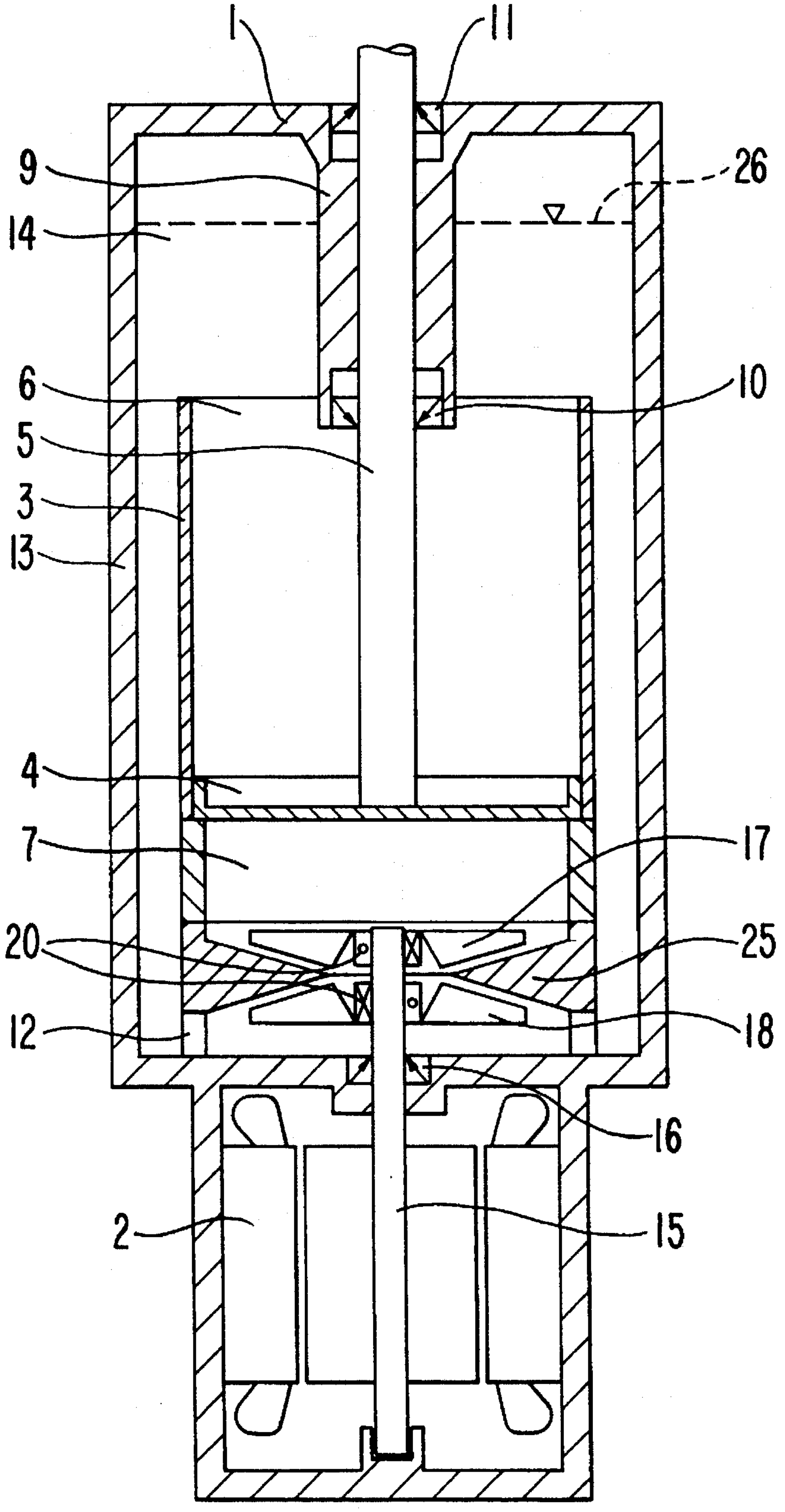
FIG. 2 is a semi-schematic illustration of the electrohydraulic device in its embodiment as an open system.

In the embodiment according to FIG. 2, the electrohydraulic device is configured as an open system, that is, cylinder 3 is open toward the top and the surface 26 of the operating fluid lies above cylinder 3. In FIG. 2, the same components as in the embodiment of FIG. 1 are given the same reference numerals.

Piston rod 5 requires only the outer seal 10 onto which acts, in contrast to FIG. 1, the pump pressure as well as the pressure due to heating of the operating fluid. Pump housing 12 is open at its lower face so that impeller wheel 18 of the second centrifugal pump, when rotating in the intended operating direction, is able to directly suck in the operating fluid. Flow body 25 between impeller wheels 17 and 18 is adapted to the shape of the impeller wheels. Since the system is an open system, the openings 21 and 22 provided in FIG. 1 are not required in this embodiment. The pressure pipe 24 required in FIG. 1 can also be dispensed with since the cylinder 3 of the embodiment of FIG. 2 lies within the operating fluid in ante-chamber 14.

Otherwise, the embodiment in FIG. 2 operates in the same manner as described for the operation of FIG. 1.

The formation of the first and second centrifugal pumps by means of impeller wheels 17 and 18 and of flow body 19 or 25, respectively, constitutes a simple and economical realization of the two centrifugal pumps. By using idler sleeves 20 it is further possible to put into operation one of the two impeller wheels and thus one of the two centrifugal pumps by simply reversing the direction of rotation of the electric motor while the other centrifugal pump idles. Due to different diameters of the two impeller wheels 17 and 18, different traction and pressure forces can be realized. If required, the electrohydraulic device may also be operated in a position in which the piston rod is not arranged in a vertical orientation.

We claim:

1. An electrohydraulic device for generating a force acting on a vertically movable piston rod, the device comprising:

a cylinder having a first end and a second end, the first end being closed;

a piston disposed in the cylinder forming a first cylinder chamber between the piston and the first end and a second cylinder chamber between the piston and the second end, the piston rod being coupled to the piston and extending through the first end of the cylinder;

a first centrifugal pump disposed at the second end of the cylinder and in communication with the second cylinder chamber, the first centrifugal pump including a first impeller wheel;

a second centrifugal pump disposed below the first centrifugal pump and in communication with the first centrifugal pump, the second centrifugal pump including a second impeller wheel;

a housing enclosing the cylinder and the first and second centrifugal pumps, and defining a reservoir for operating fluid of the electrohydraulic device, both the first and second centrifugal pumps being in communication with the reservoir through a first passage extending from the reservoir to a position between the first and second centrifugal pumps;

a flow body disposed between the first and second impeller wheels such that the flow body is in communication with the reservoir through the first passage, the flow body being spaced apart from and adapted to a course of the first and second impeller wheels; and an electric motor coupled to the first centrifugal pump and the second centrifugal pump by a shaft, the first impeller wheel being spaced apart from the second impeller wheel, when the electric motor rotates in a first direction, the shaft drives the first centrifugal pump while the second centrifugal pump is idle and when the electric motor rotates in a second direction, the shaft drives the second centrifugal pump while the first centrifugal pump is idle;

wherein the operating fluid is pumped through a pressure conduit between the first cylinder chamber and the second cylinder chamber by the first and second centrifugal pumps as a function of a direction of rotation of the electric motor causing the piston to move based on pressure acting on the piston and generating a force at the piston rod.

2. An electrohydraulic device according to claim 1, wherein the first and second impeller wheels are respectively mounted on the shaft by oppositely rotating idler sleeves.

3. An electrohydraulic device according to claim 1, wherein the first and second impeller wheels have different diameters.

4. An electrohydraulic device for generating a force acting on a vertically movable piston rod, the device comprising:

a cylinder having a first and second end, the first end being open;

a piston disposed in the cylinder forming a first cylinder portion between the piston and the first end and a second cylinder portion between the piston and the second end, and the piston being coupled to the piston rod with the piston rod extending toward the first end of the cylinder;

a first centrifugal pump disposed at the second end of the cylinders, the first centrifugal pump including a first impeller wheel;

a second centrifugal pump disposed below the first centrifugal pump and in communication with the first centrifugal pump and the first cylinder portion, the second centrifugal pump including a second impeller wheel;

a flow body disposed between the first and second impeller wheels;

a housing enclosing the cylinder and the first and second centrifugal pumps, and defining a reservoir for operating fluid of the electrohydraulic device, the reservoir including the first cylinder portion; and an electric motor coupled to the first centrifugal pump and the second centrifugal pump by a shaft, the first impeller wheel and the second impeller wheel being arranged on the shaft with the first impeller wheel being spaced apart from the second impeller wheel, and the first and second impeller wheels being respectively mounted on the shaft by oppositely rotating idler sleeves, when the electric motor rotates in a first direction, the shaft drives the first centrifugal pump while the second centrifugal pump is idle and when the electric motor rotates in a second direction, the shaft drives the second centrifugal pump while the first centrifugal pump is idle;

wherein the operating fluid is pumped between the first cylinder portion and the second cylinder portion as a function of a direction of rotation of the electric motor causing the piston to move based on pressure acting on the piston and generating a force at the piston rod.

5. An electrohydraulic device according to claim 4, wherein the flow body is spaced apart from and adapted to the course of the first and second impeller wheels.

6. An electrohydraulic device according to claim 4, wherein the first and second impeller wheels have different diameters.

* * * * *